United States Patent Office
3,312,696
Patented Apr. 4, 1967

3,312,696
2-TERTIARY AMINO ALKOXY-BETA-PHENYL-PROPIOPHENONES
Luigi Turbanti, Via Buonaccorso da Padule 10, Pisa, Italy
No Drawing. Filed Feb. 20, 1964, Ser. No. 346,088
7 Claims. (Cl. 260—247.7)

This invention relates to a series of novel chemical compounds that find a useful application as coronary dilatory agents in the therapy of cardiopathies, coronaropathies, stenocardia, precordialgia and coronary insufficiencies in general.

More precisely, this invention concerns the compounds that are represented by the following general formulae:

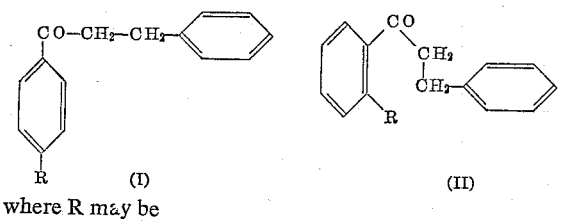

where R may be

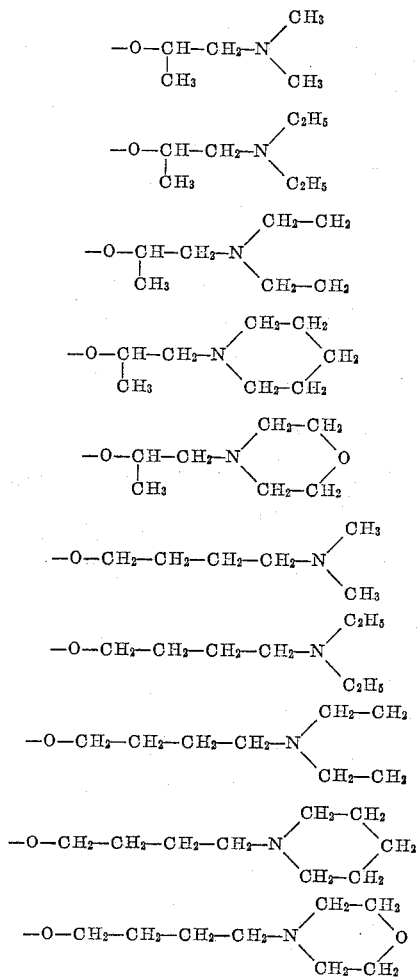

The coronary dilatory activity of such novel drugs has been ascertained on fibrillating and not fibrillating, Langendorff's perfused, isolated hearths of rabbits and guinea pigs. In particular, some drugs have proved to be much more active than the kelline and theophylline, over which they show a much more favourable therapeutic index.

Highly advantageous, for all applications in the clinical field, is the sharp specificity as shown by the novel drugs for the coronary district, in preference to all other vasal districts. In fact, doses much larger than those suggested for the therapy of coronaropathies are to be administered, before that changes in the blood pressure levels can be observed in the experimental animals.

The drugs that form the object of this patent, have been synthetized by us, by one or more of the following general methods, as specified in a more thorough manner later, in the description of single drugs.

(A) A toluene solution of 2-hydroxy-$\beta$-phenyl-propiophenone, or of 4-hydroxy-$\beta$-phenyl-propiophenone was heated and stirred during several hours, together with one or more equivalents of an halide salt of a 2-dialkylamino-1-methyl-ethyl halide, or of a 2-cyclo-methylene amino-1-methyl-ethyl halide, or of a 4-dialkyl-aminobutyl halide, or of a 4-cyclomethylene-amino-butyl halide, in the preesnce of an inorganic or organic acid acceptor, as e.g. $K_2CO_3$, $NA_2CO_3$ or triethylamine.

The required product was isolated from the filtered and dried organic solution, by fractional distillation, or it was precipitated as hydrochloride salt by having dry HCl bubbled through same solution.

(B) A suspension of 2-sodium oxy-$\beta$-phenyl-propiophenone, or of its isomer 4-sodium oxy-$\beta$-phenyl-propiophenone in toluene or other neutral organic solvent, was heated and stirred during several hours together with one, or more equivalents of a 2-dialkylamino-1-methyl-ethyl halide, or of a 2-cyclomethylene-amino-1-methyl-ethyl halide.

The required product was then isolated as stated in the method A.

(C) One equivalent of 2-, or 4-(4'-bromobutoxy)-$\beta$-phenyl-propiophenone, or of 2-, or 4-(4'-chlorobutoxy)-$\beta$-phenyl-propiophenone, respectively obtained from 2-, and 4-hydroxy-$\beta$-phenyl-propiophenone, and 1.4-dibromobutane, or 1-bromo-4-chloro-butane in ethanol, in the presence of sodium ethylate, was heated at 80° C. in a closed vessel, during 3 hrs., together with two equivalents of a secondary organic base (dimethylamine, diethylamine, pyrrolidine, piperidine or morpholine) whereafter the mixture was taken-up with $H_2O$, the oil was decanted and repeatedly washed with $H_2O$, and finally extracted with ether. The required product was isolated therefrom by evaporation of solvent and purification of residue by fractional distillation or crystallization, or by precipitation from the ether solution under the form of hydrochloride salt, by having dry HCl bubbled through same solution.

Now, according to our experiences, the abovedescribed general methods, have not proved to be alternately valids for all derivatives. Therefore, in the following description of all compounds that form the objects of this invention, the method(s) followed for making each product shall be specified.

(1) *4-(4'-dimethylaminobutoxy)-$\beta$-phenyl-propiophenone*

$$\left(\text{I, where R} = -O-CH_2-CH_2-CH_2-CH_2-N\begin{matrix}CH_3\\CH_3\end{matrix}\right)$$

*Method C.*—5.5 g. of 4-(4'-bromobutoxy)-$\beta$-phenyl-propiophenone (raw), obtained by refluxing for 10 minutes a 10% alcohol solution of 4-hydroxy-$\beta$-phenyl-propiophenone, together with one equivalent of sodium ethylate, and four equivalents of 1.4-dibromobutane; then cooling and collecting the reaction product on a filter, and purifying same product by washing it with water, and crystallization from ethanol—were put, together with 2.1 cc. of dimethylamine, into a vessel provided with a tight closing cover, and kept at room temperature for 5–6 hrs., then heated at 60° C. for 3 hrs. The reaction mixture was taken-up with a few water, and extracted with ether. The ether extract, after having been repeatedly washed with water, was dried and processed with gaseous HCl, thereby obtaining the 4-(4'-dimethyl-aminobutoxy)-β-phenyl-propiophenone hydrochloride, a portion of which, dissolved in a few water and treated at room temperature with a diluted solution of NaOH, gave off the 4-(4'-dimethyl-aminobutoxy)-β-phenyl-propiophenone, under the form of an oil, that did then freeze in its mother liquor and that, after purification by crystallization from diluted ethanol, showed itself as a colorless compound, M.P. 40°–42° C.

*Hydrochloride salts.*—The abovestated raw compound, purified by crystallization from isopropanol, gave colorless crystals, M.P. 153°–4° C.

(2) *4-(4'-diethylaminobutoxy)-β-phenyl-propiophenone*

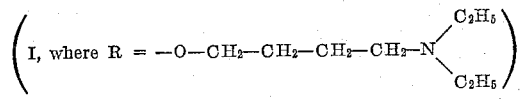

*Method C.*—4.5 g. of raw 4-(4'-bromobutoxy-β-phenyl-propiophenone, and 2 g. of diethylamine, were put into a vessel fitted with a tight closing cover, kept at room temperature for 5–6 hrs., and then heated at 60° C. for 3 hrs. The reaction mixture was taken-up with water, and extracted with ether, whereafter the ether extract, after having been washed with water, was dried and evaporated, thus leaving an oil that froze spontaneously. Thus, the 4-(4'-diethyl-aminobutoxy)-β-phenyl-propiophenone was obtained under the form of colorless crystals, M.P. 27.5°–9° C.

*Hydrochloride salt.*—A portion of the abovedescribed base was dissolved in ether, and gaseous HCl was bubbled therethrough, thus obtaining the 4 - (4' - diethylamino-butoxy)-β-phenyl-propiophenone hydrochloride which, crystallized from isopropanol, showed itself under the form of a crystalline compound, M.P. 132°–4° C.

(3) *4-[4'(N-pyrrolidino)-butoxy]-β-phenyl-propiophenone*

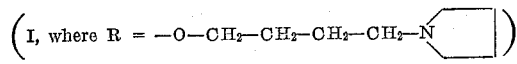

*Method C.*—5 g. of 4-(4'-bromobutoxy)-β-phenyl-propiophenone and 2.05 g. of pyrrolidine were put into a vessel fitted with a tight closing cover; the reaction started already at room temperature with evolution of heat, and after a prolonged rest time, was completed by heating for 3 hrs. at 60° C. The reaction mixture was then taken-up, and extracted with a plenty of ether. The ether extract, dried and evaporated, gave an oily residue, that froze spontaneously. Such residue was extracted with cold ethyl alcohol; the resulting alcohol solution was concentrated down to a small volume, then diluted with ether, and finally gaseous HCl was bubbled therethrough, thus obtaining the 4-[4'-(N-pyrrolidino)-butoxy]-β-phenyl-propiophenone hydrochloride. A portion of such salt was finally dissolved in few water and treated with a diluted solution of NaOH, which resulted in a slow precipitation of 4-[4'-(N-pyrrolidino)-butoxy] - β - phenyl-propiophenone, under the form of colorless crystals that, after having been crystallized from petroleum ether, showed a M.P. 48°–9° C.

*Hydrochloride salt.* — The abovestated raw product, after having been repeatedly purified by crystallization from isopropanol, gave colorless crystals, M.P. 164.5°–166.5° C.

(4) *4-[4'-(N-piperidino)-butoxy]-β-phenyl-propiophenone*

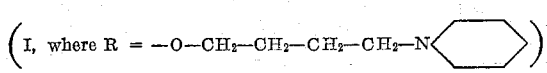

*Method A.*—7.1 g. of 4-hydroxy-β-phenyl-propiophenone, 7.5 g. of 4-(N-piperidin)-butylchloride hydrochloride, and 5.2 g. of $K_2CO_3$ were suspended in 100 cc. of anhydrous toluene, and refluxed while stirring for 20 hrs. Then, the reaction mixture was filtered, the inorganic portion was washed with a few toluene and ether, and gaseous HCl was bubbled through the filtrate, to which the washings were added. Thus the 4-[4'-(N-piperidino)-butoxy]-β-phenyl-propiophenone hydrochloride was separated. A portion of such salt was dissolved in few water, and a diluted NaOH solution was added thereto; from the alkaline solution, an oil separated itself, that froze after a long rest time in its mother liquor. Such product, crystallized from diluted acetone gave the 4-[4'-(N-piperidino)-butoxy]-β-phenyl - propiophenone, under the form of colorless crystals, having a M.P. 44°–46° C.

*Hydrochloride salt.* — The abovestated raw product, crystallized from isopropanol, gave colorless crystals, M.P. 171.5°–173° C.

*Method C.*—The 4-[4'-(N-piperidino)-butoxy]-β-phenyl-propiophenone was obtained also starting from 5 g. of 4-(4'-bromobutoxy)-β-phenyl-propiophenone, and 2.2 g. of piperidine, and following the same procedure as stated in the Example 2.

(5) *4-[4'-(N-morpholino)-butoxy]-β-phenyl-propiophenone*

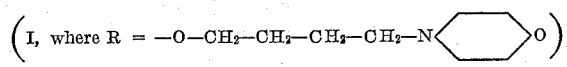

*Method A.*—8 g. of 4-hydroxy-β-phenyl-propiophenone, 9 g. of 4-(N-morpholin)-butylchloride hydrochloride, and 5.8 g. of $K_2CO_3$ in 100 cc. of anhydrous toluene, were processed as stated in the Example 4.

The 4-[4' - (N-morpholino)-butoxy]-β-phenyl-propiophenone was isolated under the form of colorless crystals, M.P. 63–6° C.

*Hydrochloride salt.*—Such salt was also obtained by purification of raw product as precipitated from the reaction mixture by means of gaseous HCl, under the form of colorless crystals, having a M.P. 165.5°–166.5° C.

*Method C.*—The 4-[4'-(N-morpholino) - butoxy] - β-phenyl-propiophenone was obtained even by starting from 5 g. of 4-(4'-bromobutoxy)-β-phenyl-propiophenone, and 2.20 g. of morpholine, and following the same procedure as stated in the Example 2.

(6) *2-(4'-dimethylamino-butoxy)-β-phenyl-propiophenone*

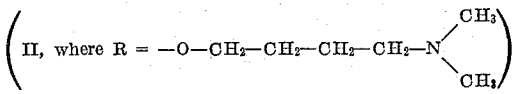

*Method C.*—9 g. of 2-(4'-bromobutoxy) - β - phenyl-propiophenone (raw) obtained by refluxing for two hrs. a 6% alcohol solution of 2-hydroxy-β-phenyl-propiophenone, together with one equivalent of sodium ethylate, and 1.5 equivalents of dibromobutane, whereafter the solvent was distilled-off, the residue was washed with water and extracted with ether, the ether extract was vacuum-distillated after the removal of water, collecting the fraction with $B.P._{0.45}$ 219±5° C.—and 3.4 cc. of dimethylamine, were put into a vessel provided with a tightly closing cover, kept for 24 h. at room temperature, and then heated at 60° C. for 3 h. The reaction mixture was taken-up with water, and extracted with ether. The ether extract, after having been washed with water, dried and evaporated, gave an oily residue, which did get spoiled on attempting to have it high-vacuum distilled.

*Hydrochloride salt.* — An undistilled portion of the abovestated oily residue, was dissolved in ether, and gaseous HCl was bubbled through the ether solution, thus obtaining a precipitate that after filtering and crystallization from isopropanol gave the 2-(4'-dimethylaminobutoxy)-β-phenyl - propiophenone hydrochloride, under the form of colorless crystals, M.P. 121.5°–122.5° C.

(7) *2-(4'-diethylaminobutoxy)-β-phenyl-propiophenone*

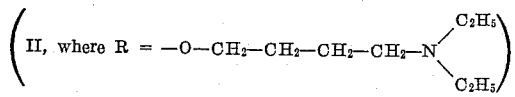

*Method C.*—7.5 g. of 2-(4'-bromobutoxy)-β-phenyl-propiophenone, and 3.15 g. of diethylamine, were processed as stated in the Example 6, giving an oily residue, which did get spoiled on attempting to have it high-vacuum distilled.

*Hydrochloride salts.*—An undistilled portion of the abovestated oily residue, was dissolved in ether, and gaseous HCl was bubbled through the ether solution, thus obtaining a precipitate that after crystallization from acetone gave the 2-(4'-diethylamino-butoxy)-β-phenyl-propiophenone hydrochloride, under the form of colorless crystals, M.P. 101–102° C.

(8) *2-[4'-(N-pyrrolidino)-butoxy]-β-phenyl propiophenone*

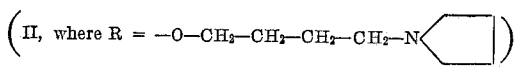

*Method C.*—10 g. of 2-(4'-bromo-butoxy)-β-phenyl-propiophenone, and 4.1 g. of pyrrolidine were put into a vessel fitted with a tight closing cover, left at rest therein for 24 h. at room temperature, and then heated at 60° C. for 3 h. The reaction mixture was taken-up with water and extracted with ether; the ether extract, after having been repeatedly washed with water, was dried and evaporated, leaving an oily residue that was vacuum-distilled. The 2-[4'-(N-pyrrolidino)-butoxy]-β-phenyl-propiophenone was thus collected under the form of a clear oil, having a B.P.$_{0.65\ mm.\ Hg}$225±1° C.

*Hydrochloride salt.*—By having gaseous HCl bubbled through an ether solution of the abovestated base, the 2-[4' - (N-pyrrolidino-butoxy]-β-phenyl-propiophenone hydrochloride was obtained. Such salt, purified by crystallization from isopropanol, was under the form of colorless crystals, M.P. 128°–130° C.

(9) *2-[4'-(N-piperidino)-butoxy]-β-phenyl-propiophenone*

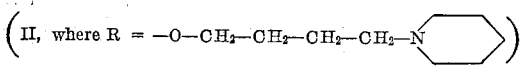

*Method C.*—10 g. of 2-(4'-bromobutoxy)-β-phenyl-propiophenone, and 5 g. of piperidine, were processed as stated in the Example 8, whereafter the 2-[4'-(N-piperidino)-butoxy]-β-phenyl-propiophenone was isolated under the form of a clear oil, B.P.$_{0.7\ mm.\ Hg}$230°–232° C.

*Hydrochloride salt.*—By having gaseous HCl bubbled through an ether solution of a portion of the abovedescribed base, the 2-[4'-(N-piperidino)-butoxy]-β-phenyl-propiophenone hydrochloride was obtained. Such salt, purified by crystallization from acetone, was under the form of colorless crystals, M.P. 129.5°–131.5° C.

(10) *2-[4'-(N-morpholino)-butoxy]-β-phenyl-propiophenone*

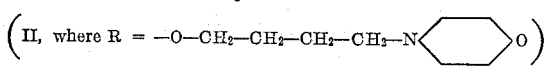

*Method C.*—10 g. of 2-(4'-bromo-butoxy)-β-phenyl-propiophenone, and 5 g. of morpholine, were put into a vessel fitted with a tight closing cover, left at rest therein for 24 hrs. at room temperature, and then heated at 60° C. for three h., whereafter the reaction mixture was taken-up with water and extracted with ether, the ether extract was washed with water, dried, and gaseous HCl was bubbled therethrough, thus forming a precipitate of raw 2 - [4' - (N - morpholino)-butoxy]-β-phenyl-propiophenone hydrochloride; from an approximately purified portion of such product, dissolved in a few water, and alkalinized with NaOH, the 2-[4'-(N-morpholino)-butoxy]-β-phenyl-propiophenone was precipitated. Such product, crystallized from petroleum ether, was under the form of crystals, M.P. 39°–41° C.

*Hydrochloride salt.*—The abovestated raw product, crystallized from isopropanol, is under the form of colorless crystals, M.P. 119.5°–20.5° C.

(11) *4-(2'-dimethylamino-1'-methyl-ethoxy)-β-phenyl-propiophenone*

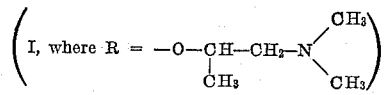

*Method A.*—10 g. of 4-hydroxy-β-phenyl-propiophenone, 8.50 g. of β-dimethylamino-isopropylchloride hydrochloride, and 7.5 g. of K$_2$CO$_3$ were suspended in 100 cc. of anhydrous toluene, and refluxed, while stirring, for 20 h.

Gaseous HCl was bubbled through the toluene solution, after all inorganic matters were filtered out therefrom, thus obtaining the 4-(2'-dimethylamino-1'-methyl-ethoxy)-β-phenyl-propiophenone hydrochloride; such salt was dissolved, in its raw condition, in a few water; the resulting aqueous solution was alkalinized with NaOH, and extracted with ether. By distilling the residue left by the dried and evaporated ether extract, the 4-(2'-dimethylamino-1'-methyl-ethoxy)-β-phenyl - propiophenone was obtained under the form of a clear oil, B.P.$_{0.35\ mm.\ Hg}$209±1° C.

*Hydrochloride salt.*—By having gaseous HCl bubbled through an ether solution of a portion of the abovedescribed base, the 4-(2'-dimethylamino-1'-methyl-ethoxy)-β-phenyl-propiophenone hydrochloride was separated under the form of a thick oil that did freeze after washing with ether, and that, crystallized from isopropanol, was under the form of colorless crystals, M.P. 158°–161° C.

*Method B.*—The 4 - (2' - dimethylamino - 1' - methyl-ethoxy)-β-phenyl-propiophenone was obtained also by starting from 16.8 g. of 4-sodium-oxy-β-phenyl-propiophenone, and 8.2 g. of β-dimethylamino-isopropyl chloride in 150 cc. of anhydrous toluene, and following the same procedure as previously described for the method A.

(12) *4-(2'-diethylamino-1'-methyl-ethoxy)-β-phenyl-propiophenone*

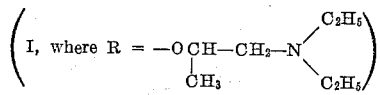

*Method A.*—6.7 g. of 4 - hydroxy - β - phenyl - propiophenone, 6.6 g. of β-diethylamino-isopropylchloride hydrochloride, and 50 g. of anhydrous toluene were processed as stated in the Example 11.

The 4 - (2' - diethylamino-1'-methyl-ethoxy)-β-phenyl-propiophenone was isolated under the form of an oil, B.P.$_{0.25\ mm.\ Hg}$212.5° C.

*Hydrochloride salt.*—1 g. of the abovespecified base was dissolved in 3.2 cc. of HCl N/1 equivalent. The only residue left by the aqueous solution after vacuum evaporation at room temperature, was washed with petroleum ether and crystallized from an alcohol:ether (1:1) mixture, thereby giving the 4-(2'-diethylamino-1'-methyl-ethoxy)-β-phenyl-propiophenone hydrochloride, under the form of colorless crystals, M.P. 144°–147° C.

*Method B.*—The 4 - (2' - diethylamino - 1' - methyl-ethoxy)-β-phenyl-propiophenone was obtained also by starting from 8.2 g. of 4-sodium-oxy-β-phenyl-propiophenone, and 4 g. of β-diethylamino-isopropyl-chloride in 50 cc. of anhydrous toluene, and following the same procedure as stated above for the method A.

(13) 4-[2'-(N-pyrrolidino)-1'-methyl-ethoxy]-β-phenyl-propiophenone

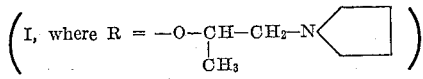

*Method A.*—11 g. of 4-hydroxy-β-phenyl-propiophenone, 10 g. of β-(N-pyrrolidin)-isopropylchloride.hydrochloride, and 9 g. of $K_2CO_3$ were processed as stated in the Example 11. The 4-[2' - (-pyrrolidino)-1'-methyl-ethoxy]-β-phenyl-propiophenone was isolated under the form of a clear oil, $B.P._{0.55\ mm.\ Hg}$ 230°–231° C.

*Hydrochloride salt.*—1 g. of the above described base was dissolved in 2.95 cc. of HCl N/1. The oily residue left by the aqueous solution, vacuum evaporated at room temperature, after having been washed with petroleum ether, and crystallized from an alcohol:ether (1:1) mixture, gave the 4-[2'-(N - pyrrolidino)-1'-methyl-ethoxy]-β-phenyl-propiophenone.hydrochloride, under the form of colorless crystals, M.P. 146°–148.5° C.

*Method B.*—The 4 - [2' - (N-pyrrolidino)-1'-methyl-ethoxy]-β-phenyl-propiophenone was obtained also by starting from 10.3 g. of 4-sodium-oxy-β-phenyl-propiophenone, and 7.3 g. of β-(N-pyrrolidino)-isopropyl-chloride in 100 cc. of anhydrous toluene, and following the same procedure as stated above for the method A.

(14) 4-[2'-(N-piperidino)-1'-methyl-ethoxy]-β-phenyl-propiophenone

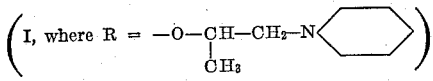

*Method A.*—15 g. of 4-hydroxy-β-phenyl-propiophenone, 15.6 of β-(N-piperidin)-isopropyl-chloride.hydrochloride, and 11 g. of $K_2CO_3$ in 200 cc. of anhydrous toluene, were processed as stated in the Example 11. The 4-[2'-(N-piperidino) - 1' - methylethoxy]-β-phenyl-propiophenone was isolated under the form of a clear oil, $B.P._{0.5}$ 227±2° C.

*Hydrochloride salt.*—A portion of the abovestated base was dissolved in ether, and gaseous HCl was bubbled therethrough, which resulted in the separation of 4-[2'-(N-piperidino)-1'-methylethoxy] - β - phenyl-propiophenone.hydrochloride under the form of a thick oil. Such oil, purified by merely washing it with ether, gave finally colorless crystals, M.P. 121°–123.5° C.

*Method B.*—The 4-[2' - (N - piperidino)-1'-methylethoxy]-β-phenyl-propiophenone was obtained also by starting from 12.1 g. of 4-sodium-oxy-β-phenyl-propiophenone, and 7.9 g. of β-(N-piperidyl)-isopropyl-chloride in 100 cc. of anhydrous toluene, by following the same procedure as stated above for the method A.

(15) 4-[2'-(N-morpholino)-1'-methyl-ethoxy]-β-phenyl-propiophenone

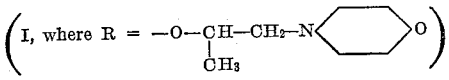

*Method A.*—9.2 g. of 4-hydroxy-β-phenyl-propiophenone, 10 g. of β-(N-morpholin)-isopropyl-chloride.hydrochloride, and 6.6 g. of $K_2CO_3$ in 100 cc. of anhydrous toluene, were processed as stated in the Example 11. The 4-[2'-(N-morpholino)-1'-methyl-ethoxy] - β - phenyl-propiophenone was isolated under the form of a clear oil, $B.P._{0.25}$ 239° C.

*Hydrochloride salt.*—In many attempts to get such salt, we did not succeed in obtaining a product sufficiently stable so as to allow the required determinations of analytical and physical data.

*Method B.*—The 4-[2'-(N-morpholino) - 1' - methyl-ethoxy]-β-phenyl-propiophenone was obtained also by starting from 8.7 g. of 4-sodium-oxy-β-phenyl-propiophenone, and 6.4 g. of β-(N-morpholino)-isopropyl-chloride in 70 cc. of anhydrous toluene, and following the same procedure as stated above for the method A.

(16) 2-(2'-dimethylamino-1'-methyl-ethoxy)-β-phenyl-propiophenone

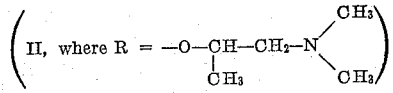

*Method B.*—14 g. of 2 - sodium-oxy-β-phenyl-propiophenone, and 6.8 g. of β-dimethylamino-isopropyl-chloride, were suspended in 150 cc. of anhydrous toluene, and heated up to 130° C., while stirring, for 20 hrs. The toluene solution, after having filtered-off the inorganic matters, was treated with gaseous HCl, whereupon the separated product was dissolved in water, the resulting aqueous solution was alkalinized with NaOH and extracted with ether. The vacuum fractionated oily residue, left by the dried and evaporated ether extract, gave the 2-(2'-dimethylamino - 1' - methyl-ethoxy)-β-phenyl-propiophenone under the form of a clear oil, $B.P._{4.5\ mm.\ Hg}$ 184±1° C.

*Hydrochloride salt.*—1 g. of the above described base was dissolved in 3.2 cc. of HCl N/1. The aqueous solution, vacuum dried at room temperature, gave an oily residue that after having been washed with petroleum ether, was crystallized from isopropanol thus giving the 2-(2'-dimethylamino-1'-methyl) - β - phenyl - propiophenone.hydrochloride under the form of colorless crystals, M.P. 112–113.5° C.

(17) 2-(2'-diethylamino-1'-methyl-ethoxy)-β-phenyl-propiophenone

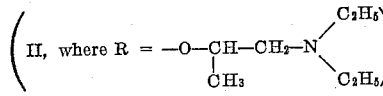

*Method B.*—8.2 g. of 2-sodium-oxy-β-phenyl-propiophenone, and 4 g. of β-diethylamino-propyl-chloride in 50 cc. of anhydrous toluene were processed as stated in Example 16. The 2-(2'-diethylamino-1'-methyl-ethoxy) β-phenyl-propiophenone was isolated under the form of a clear oil, $B.P._{0.7\ mm.\ Hg}$ 198±1° C.

*Hydrochloride salt.*—1.75 g. of the abovedescribed base were dissolved in 5 cc. of HCl N/1. The oily residue left by the aqueous solution, vacuum evaporated at room temperature, was washed with petroleum ether, and repeatedly crystallized from acetone, thereby obtaining the 2-(2' - diethylamino - 1' - methyl)-β-phenyl-propriophenone.hydrochloride, under the form of colorless crystals, M.P. 128–129.5° C.

(18) 2-[2'-(N-pyrrolidino)-1'-methyl-ethoxy]-β-phenyl-propiophenone

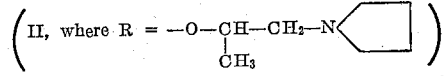

*Method B.*—15.4 g. of 2-sodium-oxy-β-phenyl-propiophenone, and 11 g. of β-(N-pyrrolidin)-isopropyl-chloride in 130 cc. of anhydrous toluene, were processed as stated in the Example 16.

The 2-[2'-(N-pyrrolidino)-1'-methyl-ethoxy]-β-phenyl-propiophenone was isolated under the form of a clear oil, $B.P._{0.5\ mm.\ Hg}$ 208°–210° C.

*Hydrochloride salt.*—1.25 g. of the above stated base were dissolved in 3.6 cc. of HCl N/1. The oily residue, left by the aqueous solution, vacuum-evaporated at room temperature, after having been washed with petroleum ether and crystallized from an alcohol:ether (1:2) mixture, gave the 2-[2'-(N-pyrrolidin)-1'-methyl-ethoxy]-β-phenyl-propiophenone.hydrochloride under the form of colorless crystals, M.P. 113.5°–115.5° C.

(19) 2-[2'-(N-piperidino)-1'-methyl-ethoxy]-β-phenyl-propiophenone

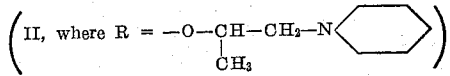

*Method B.*—17 g. of 2-sodium-oxy-β-phenyl-propiophenone, and 11 g. of β-(N-piperidino)-isopropyl-chloride in 150 cc. of anhydrous toluene were processed as described in Example 16. The 2-[2'-(N-piperidino)-1'-methyl-ethoxy] - β - phenyl-propiophenone was isolated under the form of a clear oil, B.P.$_{0.6\ mm.\ Hg}$ 213° C.

*Hydrochloride salt.*—By having gaseous HCl bubbled through an ether solution of the abovedescribed base, a slow separation of the 2-[2'-(N-piperidino)-1'-methyl-ethoxy]-β-phenyl-propiophenone.hydrochloride occurred. Such salt, crystallized from isopropanol:ether (1:3), was under the form of colorless crystals, M.P. 140°–142.5° C.

(20) *2-[2'-(N-morpholino)-1'-methyl-ethoxy]-β-phenyl-propiophenone*

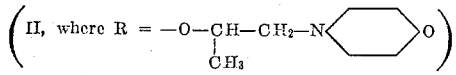

*Method B.*—9.70 g. of 2-sodium-oxy-β-phenyl-propiophenone, and 6.4 g. of β-(N-morpholino)-propyl-chloride in 100 cc. of anhydrous toluene were processed as stated in the Example 16. The 2-[2'-(N-morpholino)-1'-methyl-ethoxy] - β - phenyl-propiophenone was isolated firstly by fractional distillation under the form of a clear oil, that froze spontaneously while after a crystallization from a 70% alcohol, it was under the form of colorless crystals, M.P. 48°–50° C.

*Hydrochloride salt.*—A portion of the abovestated base, was dissolved in ether, and gaseous HCl was bubbled therethrough, whereby it gave the 2-[2'-(N-morpholino)-1'-methyl - ethoxy]-β-phenyl-propiophenone.hydrochloride under the form of a thick oil which, after having been purified by washing with petroleum ether and repeated crystallization from an acetone:ether mixture, was under the form of colorless crystals, M.P. 82°–84° C.

What I claim is:

1. A compound selected from the group consisting of compounds of the formula

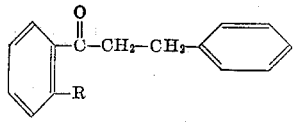

wherein R is selected from the group consisting of

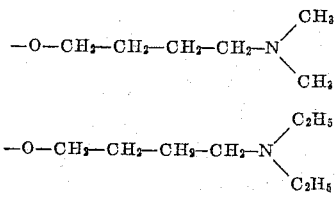

and

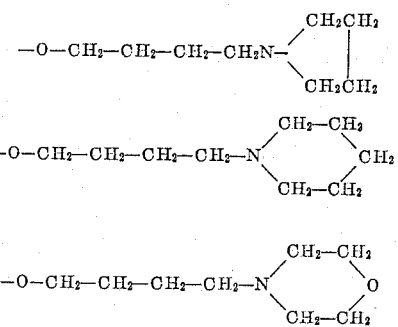

and acid addition salts thereof.

2. A compound as defined in claim 1, wherein said acid addition salt is the hydrochloride of the compound of said formula.

3. A compound as defined in claim 1, wherein R is

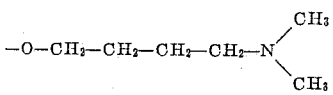

4. A compound as defined in claim 1, wherein R is

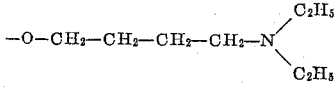

5. A compound as defined in claim 1, wherein R is

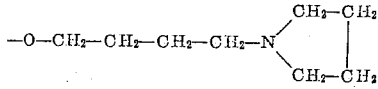

6. A compound as defined in claim 1, wherein R is

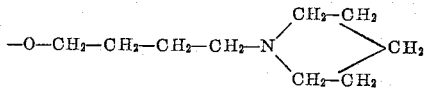

7. A compound as defined in claim 1, wherein R is

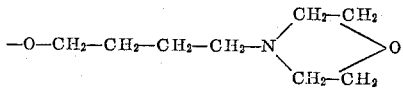

References Cited by the Examiner

Turbanti et al., Farmaco Pavia (Ed. Sci.), vol. 17, pp. 658–9 (1962).

ALEX MAZEL, *Primary Examiner.*

JOSE TOVAR, *Assistant Examiner.*